United States Patent [19]

Parker et al.

[11] 4,112,037
[45] Sep. 5, 1978

[54] PROCESS OF MAKING AIR FILTER FABRIC

[75] Inventors: Roy B. Parker, Monmouth; Richard R. Saindon, Hebron, both of Me.

[73] Assignee: Albany International Corp., Albany, N.Y.

[21] Appl. No.: 763,898

[22] Filed: Jan. 31, 1977

[51] Int. Cl.² .......................... D04H 1/46; D04H 1/54
[52] U.S. Cl. ...................................... 264/126; 264/113; 264/122; 264/123; 264/127; 264/130; 264/134; 264/136
[58] Field of Search ............... 264/113, 122, 123, 126, 264/127, 130, 134, 136; 156/148; 428/288, 300, 301, 296

[56] References Cited

U.S. PATENT DOCUMENTS

| | | | |
|---|---|---|---|
| 2,497,117 | 2/1950 | Dreyfus | 264/126 |
| 3,895,151 | 7/1975 | Matthews et al. | 428/288 X |
| 3,947,537 | 3/1976 | Buntin et al. | 264/134 X |

FOREIGN PATENT DOCUMENTS

| | | | |
|---|---|---|---|
| 526,304 | 6/1956 | Canada | 264/126 |

*Primary Examiner*—Jan H. Silbaugh
*Attorney, Agent, or Firm*—Kane, Dalsimer, Kane, Sullivan and Kurucz

[57] ABSTRACT

The disclosure is of a method of making air filter fabrics from non-woven, thermoplastic, synthetic polymeric resin, staple textile fibers and of the fabrics so made. The method comprises providing a non-woven web of the fibers, coating the fibers with a fiber stabilizing agent, pressing the fibers together so as to rupture the film at cross-over points and fusing the fibers together at the sites of the ruptured film. The product filter fabrics are characterized by controlled high permeability, strength, wear resistance, dimensional stability, lint free surfaces and advantageous particle release properties.

3 Claims, 7 Drawing Figures

PROCESS OF MAKING AIR FILTER FABRIC

BACKGROUND OF THE INVENTION

1. Field of the Invention

The invention relates to air filtering fabrics and methods of their manufacture and more particularly relates to the manufacture of non-woven filter fabrics from thermoplastic, synthetic polymer, staple fibers and to the filter fabrics so made.

2. Brief Description of the Prior Art

The art is replete with descriptions of processes for preparing air filter fabrics from webs and batts of non-woven, thermoplastic, polymeric resin staple fibers. For example, one method of the prior art has been to compress non-woven webs of thermoplastic fibers under elevated temperatures and pressures to bond the fibers together at cross-over points of the fibers, i.e.; where the fibers touch and are pressed into contact with each other. Although this technique provides a filter fabric with unit structural integrity, it also results in a weakening of a high percentage of the individual fibers and a significant reduction in air permeability due to the occlusion or partial occlusion of a percentage of the pore openings. The difficulty may be appreciated by referring to FIG. 1, a magnified view of the fibrous structure in a prior art polypropylene fibrous filter made by the above described prior art method. As shown in FIG. 1, a high percentage of the thermoplastic fibers 10, which are normally substantially round, are flattened, pressed thin (and thereby weakened), disformed and reduce the intervening fabric pores. The fibers 10 may be aptly described as "collapsed."

Another prior art method of making filter fabrics has comprised impregnating the web of non-woven fibers with a curable resin 14 and curing the resin in place. As shown in FIG. 2, a magnified view of the polypropylene fibrous structure obtained by this latter method, this procedure will occlude at least partially the pores 15 in the fabric structure between fibers 12, thereby reducing air permeability. Although the procedure makes a strong filter fabric, it also tends to reduce the flexibility of the fabric, as those skilled in the art will appreciate, because of the increased thickness of the fiber unit and rigidification due to the cured coating.

By comparison, the method of the present invention bonds (in fact fuses) the individual staple fibers together at cross-over points without altering the fundamental shape, geometry or configuration of the basic fiber unit to any significant degree. There is no significant reduction in pore sizes or air permeability of the product filter fabric. The fabric retains a high degree of flexibility (enough to render the fabric particularly useful as an endless moving filter belt). In addition, the filter fabric of the invention gains structural integrity which was the objective of the previously described prior art methods. This structural integrity in the filter fabrics of the invention assures that they will avoid compacting of the filter mass under the impact of air flow during use. This is usually a cumulative impact under the maximum velocity of air flow over a period of time and results in reduced air permeability over a period of time. There is no weakening of individual fiber strength when the filter fabrics are made according to the process of the invention. Photomicrographs have shown that, for example, polypropylene fiber structures in the products of the process of the invention are essentially unchanged as shown in FIG. 3, a magnified view of a fibrous filter fabric of the invention. That is, the polypropylene fibers 16 remain essentially unchanged in configuration and dimension. There may be a slight bulging at times of the fiber. At the cross-over point 18 between two fibers 16, there is a fusion and blending of the fibers as more clearly seen in FIG. 4, a cross-sectional view along lines 4—4 of FIG. 3. This structure remains maximum fiber strength, maximum isotropic flexibility and maximum air permeability while gaining the added structural integrity found when the fibers are fused together at cross-over points.

The preferred filter fabrics of the invention are composites having different properties in the upper and lower surfaces with a gradient of these properties from top to bottom. More specifically, the preferred filter fabric composites of the invention have a smooth, lint free, release surface having controlled air permeability and maximum dry particle filter efficiency. The bottom surface of these fabrics of the invention on the other hand will have a high degree of abrasion resistance, air permeability and flexibility to enable their use in endless belt utilizations. The composite filter fabrics of the invention also exhibit advantageous tensile strengths through their entire thickness and transversely. These preferred composite filter fabrics are particularly useful as dry particle filters for use in moving filter belts, to be mounted in painting booths employing powder coating production lines, to collect and return excess depositions of electrostatic dry powder such as polyester, epoxy, glass and acrylic pigment powders for electrostatic deposition. The preferred belts of the invention supply the desired surface collection properties, i.e.; little penetration of fabric with small (5 to 20 micron) particles but with high air permeability for the return of collected particles to the electrostatic guns. These endless belts employing the filter fabrics of the invention are advantageous in that they reduce maintenance costs and allow for deep cleaning of the filter fabric when recovery of the dry particles is desired. The belts of the invention track well and show improved abrasion resistance and strength, particularly along the peripheral edges of the belts.

The filter fabrics of the invention exhibit long wear characteristics, low maintenance costs and do not tend to occlude or plug up with collected materials.

SUMMARY OF THE INVENTION

The invention comprises a process for making an air filter fabric, which comprises; providing a non-woven web of fusable, thermoplastic, synthetic polymer resin staple fibers;

coating the fibers with a film of a compatible fiber stabilizing agent;

pressing the coated fibers together so as to rupture said film at fiber cross-over points; and fusing the fibers together at said cross-over points.

The term "cross-over points" as used herein means those points along the lengths of any given staple fiber which are in contact with an analagous point on an adjacent fiber.

The invention also comprises air filter fabrics prepared by the process of the invention and endless filter belts fabricated therefrom. The filter fabrics of the invention are particularly useful as vacuum, reverse air flow type, air filters for high efficiency removal of dry or pneumatic dusts.

DETAILED DESCRIPTION OF THE PREFERRED EMBODIMENTS OF THE INVENTION

Figure 1:
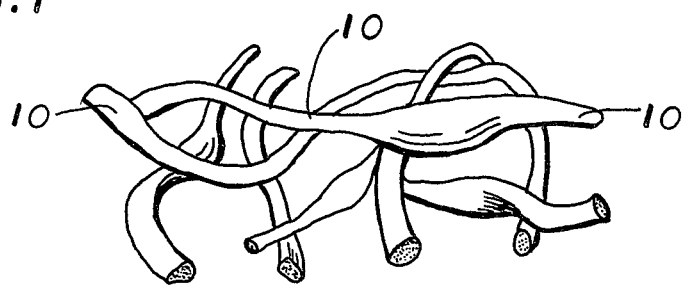
FIG. 1 is a magnified view of the fiber structure in a prior art fibrous filter.
Figure 2:
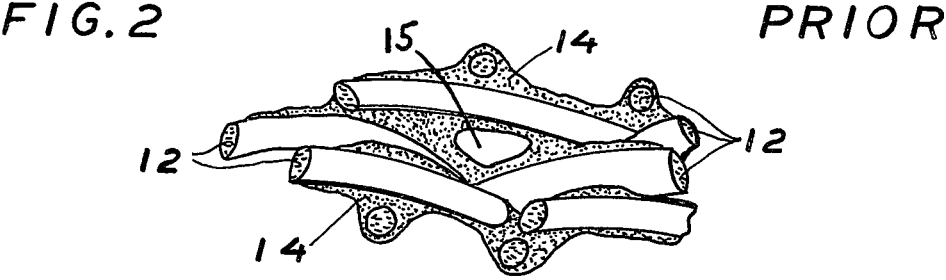
FIG. 2 is a magnified view of the fiber structure of another prior art fibrous filter.
Figure 3:
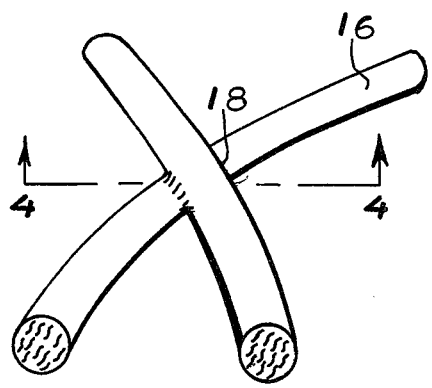
FIG. 3 is a magnified view of the fiber structure of a fibrous filter fabric on the present invention.
Figure 4:
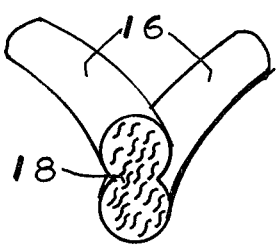
FIG. 4 is a cross-sectional view along lines 4—4 of FIG. 3.
Figures 5, 6:
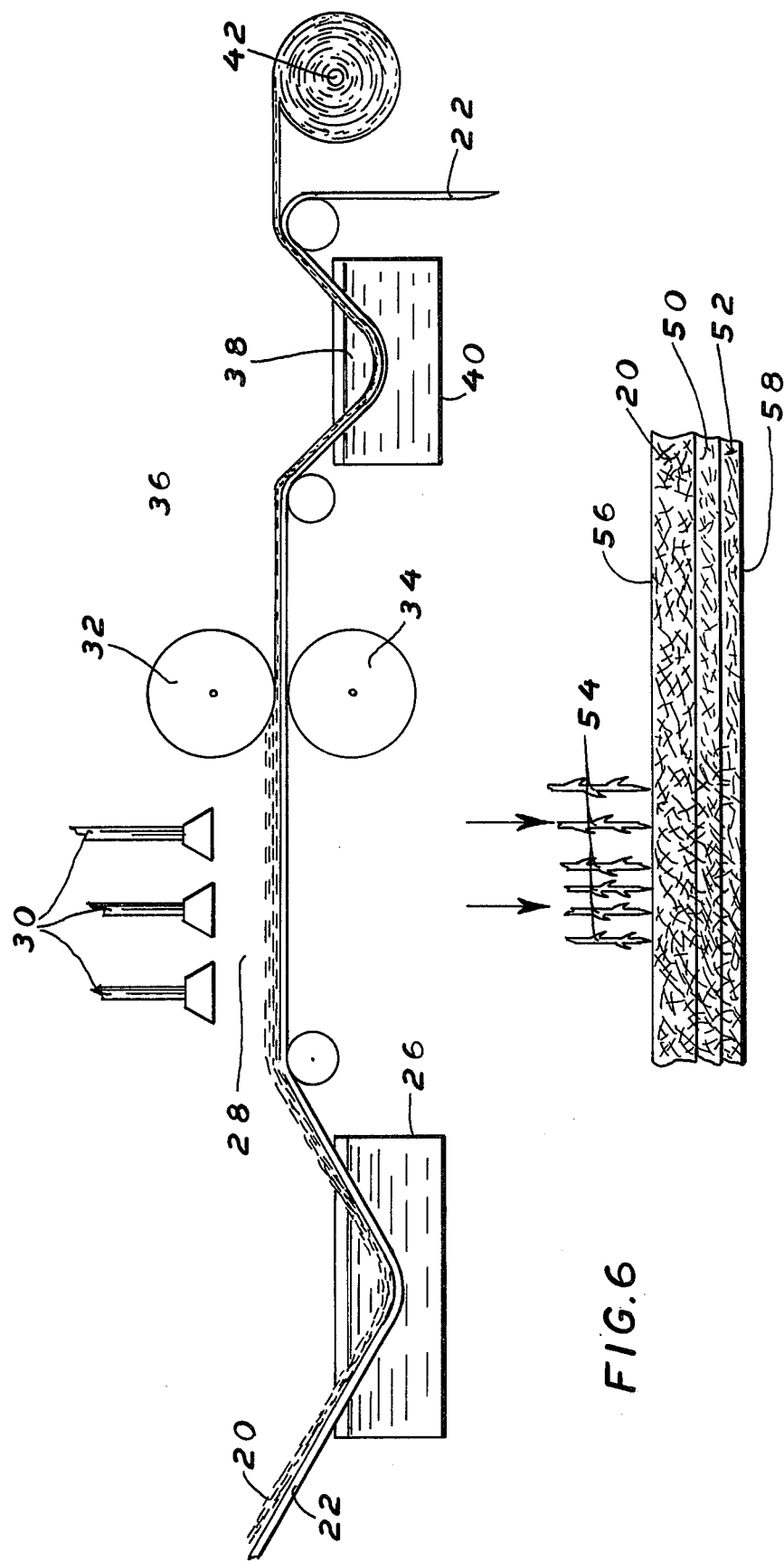
FIG. 5 is a scheme for an embodiment process of the invention.
FIG. 6 is a cross-sectional view showing a step in the preparation of a preferred filter fabric of the invention.

An embodiment process of the invention is illustrated in the scheme of FIG. 5. As shown therein, there is first provided a non-woven web 20 of thermoplastic, synthetic polymer resin staple fibers. Representative of such fibers are staple fibers of polyethylene, polypropylene, polyester, polyamide, acrylic, polytetrafluoroethylene and the like. Preferred for fabricating the filter fabrics of this invention are webs 20 constructed of polypropylene textile staple fibers. This preference is based upon the finding that the polypropylene staple fibers provide excellent surface release properties, relative chemical inertness, superior abrasion resistance and minimal moisture absorbency. The fiber lengths are preferably within the range of from about 2 to about 4 inches and preferably will have a denier of from about 1 ½ to about 15 to assure filter products characterized in part by their advantageous flexibility. For optimum efficiency in filtering small dry particles, the size of the fibers are within the range of from about 1 ½ denier to about 3. Employing fibers of the preferred deniers, pore sizes are obtained which will screen out practically all particles larger than about 3 microns.

The use of polypropylene fibers to construct the webs 20 as used in the process of the invention also assure product filters having a desired air permeability of between 70 to 80 CFM per foot square at ½ inch of water pressure. The fibers may be crimped or uncrimped as desired.

The orientation of the fibers within web 20 is not important and they may be randon in orientation. It is advantageous however when the filter material is to be employed in an endless belt construction, if the fibers within web 20 are oriented during the carding process in a direction crosswise to the intended direction of movement of the belt product on the machine.

The web 20 is advantageously formed of interlaced or interlocked staple fibers in random or oriented distribution. Such webs may be made by known techniques, for example on garnett type machinery or cotton or woolen cards. Alternatively, the fibers may be air or water laid using those well known techniques. Preferably the web 20 is pre-needled as provided in the process of the invention. The term "pre-needled" is used in its conventional sense to mean that the web of random or oriented fibers are very lightly consolidated on a needle loom to facilitate handling.

As shown in FIG. 5, the web 20, which may be supported on a conveyor belt 22 is impregnated or dipped in a bath 24 contained in a padder tank 26. The bath is of a fiber stabilizing agent. Thus, the web 20 of staple fibers 16 is coated with a film of a protective, compatible, fiber stabilizing agent. The term "compatible, fiber stabilizing agent" as used throughout the specification and claims means a fluid agent which is inert with respect to the fibers coated therewith, i.e.; does not have an adverse effect thereon and which will form a protective film thereon to stabilize and protect the fiber upon exposure to a fusing agent such as heat, solvents and the like. Preferably the fiber stabilizing agent is a film forming organic or inorganic polymeric material. Those skilled in the art will appreciate that the specific fiber stabilizing agent selected for use in the process of the invention will depend to a great extent upon the identity of the fiber to be stabilized. However, the selection of a particular agent will be appreciated by those skilled in the art upon their understanding of the present invention. As a general rule, fluid forms of organopolysiloxanes may be employed as a universal fibrous stabilizing agent for the staple fibers used in the practice of the process of the invention when the fusing agent employed is heat.

Organopolysiloxanes are a well known class of polymeric materials commonly referred to at times as "silicone oils". They are generally insoluble polymer liquids having a formula within the scope of the general formula;

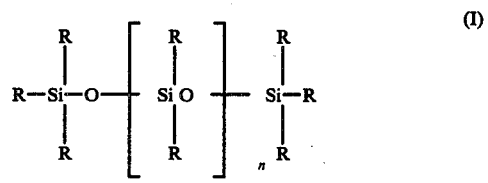

(I)

wherein R is an organic radical such as alkyl, aryl, alkaryl, aralkyl and the like and n is an integer of from 0 to 2,000. Illustrative of organopolysiloxanes of the formula I above are polydimethylsiloxane, polymethylphenylsiloxane, polymethylsiloxane and the like. Preferred as the fibrous stabilizing agent in the process of the invention is a polydimethylsiloxane. This particular fiber stabilizing agent is thermo stable over a wide range of temperatures and is not significantly changed by exposure to elevated temperatures.

Following the coating of the fibers 16 with a fiber stabilizing agent such as a polydimethylsiloxane, the web 20 passes through a drying station 28 under heater elements 30 as shown in FIG. 5. This will drive off solvent materials employed in the bath 24 with the fiber stabilizing agent. Thus, the fibers are protected by a film coating of the fiber stabilizing agent. Next, the web 20 passes through a calendar comprising upper calender roller 32 and lower calender roller 34 which are heated rollers. During passage of the web 20 through the calender rollers 32, 34, the web is compressed so as to rupture the film coating on the fibers between cross-over points of the fibers. The heat imposed by rollers 32, 34, serve to fuse the fibers 16 together at the cross-over points while those areas of the fibers which remain with an unruptured coating film are held together. Fusion is inhibited as is the flow of the fiber materials.

The compressed web 36 exiting from the calenders is then carried into a solvent bath 38 in solvent tank 40 for washing to remove the protective film of fiber stabilizing agent. The product web 36 may then be taken up on take-up reel 42.

By the process illustrated in FIG. 5, fiber integrity is maintained while the fibers are fused together completely at cross-over points. The pores are not diminished or occluded by the process of the invention. The fusion locks in the fibers, particularly at the surface where contact with the heated calender rolls was made.

As stated previously, the preferred filter fabrics of the invention are composite materials having different characteristics on top and bottom surfaces with a property gradient between. This preferred filter fabric may be prepared by needling the above described filter fabrics of the invention to a substrate having the desired lower surface properties. In needling, the fibers of the upper surface should be carried down and interlocked with fibers of the substrate layers, without drawing fibers of the substrate into the upper surface. As shown in FIG. 6, the web 20 as previously described may be needled to one or more layers such as layer 50 and layer 52 which are the same as or similar to web 20 with the exception that the fibers therein are uncoated with a fiber stabilizing agent. When needled together with needles 54, the composite article will have a top surface 56 differing from lower surface 58. The composite of layers 20, 50 and 52 may then be passed through the heated calenders to fuse the fibers in web 20 at cross-over points. Preferably, the lower calender roll 34 will be at a temperature less than the fusion temperature for the fibers 16 in layers or webs 20, 50 and 52 so that fusion only occurs in the web 20 at the top surface of the composite of 20, 50 and 52. This assures maximum flexibility in the composite filter fabric of the invention.

Figure 7:
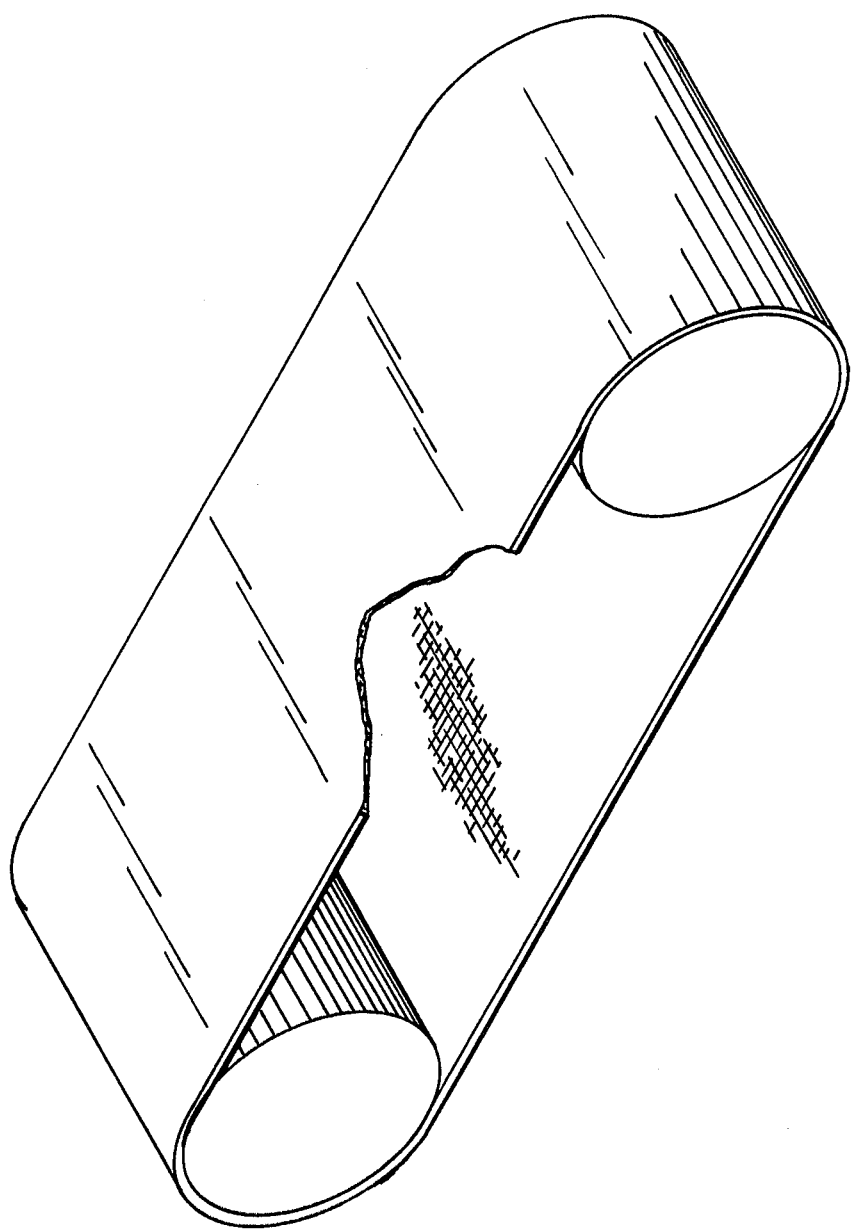
FIG. 7 is an isometric view of an embodiment endless filter belt of the invention.

The composite filter fabric as shown in FIG. 6 may then be fashioned into an endless belt as shown in FIG. 7 when this particular form of filter fabric is desired.

Those skilled in the art will appreciate that although the specific embodiment described above in relation to FIG. 5 employs heat as the fusion agent, solvents may be employed to fuse the fibers 16 together at cross-over points. When solvent are so employed, those skilled in the art will appreciate that the fiber stabilizing agent must be a compatible material which is resistant to solvation with the particular fusion solvent employed. The following examples are given to describe the manner and process of making and using the invention and set forth the best mode contemplated by the inventors of carrying out the invention, but are not to be construed as limiting.

PREPARATION 1

A suitable vessel is charged with 15.0 parts by volume of polydimethylsiloxane having a density of about 0.966 grams per milliliter (Fuser oil; Dow Corning Corporation) and 85.0 parts by volume of 1,1,1-trichloroethane. The charge is mixed thoroughly to obtain a solvent mixture of polydimethylsiloxane having a density of 1.267 grams per milliliter.

EXAMPLE 1

A pre-needled web of non-woven, random, polypropylene staple fibers (2 inch 3 denier) having a thickness of from ¼ to ⅜ inch, a strength of 5 to 15 lbs. per inch tensile and a weight of 195 grams per square foot is provided. The solvent mixture of Preparation 1, supra., is padded on to the web at a wet pick-up of 50% by weight to obtain a coated fiber web increased over the uncoated web by 5.7%. The web is dried at 150° F., allowing the 1,1,1-trichloroethane to evaporate. The dry batt is then calendered through a heated calender at a temperature of 340° F. to 350° F. at a speed of 6 yds. per minute and through a calender gap of 0.04 inch under a pressure of about 1500 lbs. psi. The calendered batt or web is then washed twice in 1,1,1-trichloroethane at 160° F. and at a speed of 5 yds. per minute to scour the polydimethylsiloxane from the web. The washed web is then dried over steam heated drying cans. The filter fabric so obtained has a weight of 215 grains per square foot, a thickness of circa 0.100 inches, and a filtering efficiency of 99.9% and excellent surface release properties. Filtrate measurements with the Coulter counter show that the filter fabric prevents passage of 5 micron and larger size particles through the fabric surface. The fabric is useful as an air filter having an air permeability of 60-80 CEM per square foot of fabric of ½ inch H₂O pressure as measured by a Frazier air permeability tester.

EXAMPLE 2

A pre-needled web of non-woven polypropylene staple fibers having a length of 2 inches and a denier of 3 is provided having a thickness of from ¼ to ⅜ inch, a strength of 5 to 15 lbs. per inch tensile and a weight of 195 grains per square foot. The solvent mixture of Preparation 1, supra., is padded onto the web at a wet pick-up of 50% by weight to obtain a coated filter web increased in weight over the uncoated web by 5.7%. The coated web is dried at room temperature by allowing the solvent 1,1,1-trichloroethane to evaporate. The dry web is then laid over a batt made by needling together on a needle loom two webs of non-woven, 3 inch, 15 denier, polypropylene staple fibers. The webs making up the needle batt substitute have a weight of 262 grams per square foot, a strength of 10 to 20 lbs. per inch tensile and a thickness of from ⅜ to ¼ inch. The overlying, coated fiber web and the substrate batt are needled together to obtain a batt comprising by weight about 27% of coated fiber and about 73% by weight of uncoated fibers, all mechanically interlocked by the needling procedure. There is however a gradient density of fibers with a preponderance of coated, shorter, smaller denier fibers on the upper surface of the web and a preponderance of longer, uncoated and larger denier fibers on the lower surface.

The three layer batt so obtained is passed through heated calenders, the top calender roller being maintained at a temperature of between 340° F. to 350° F. and the bottom calender roll at 200° F. to 250° F., at a speed of 6 yds. per minute with a calender gap of 0.05 inch and at a pressure of 1500 lbs. psi. The calendered batt has a thickness of about 0.20 inches. The calendered batt is washed twice with 1,1,1-trichloroethane at 160° F. and at a speed of 5 yds. per minute to scour the fibers of the polydimethylsiloxane. The washed batt is dried to obtain a filter fabric characterized by the following properties.

Weight: 840 grams per square foot
Thickness: 0.20 inch
Voidage: Prevents passage of 5 micron particles
Filtering efficiency: 99.98%
Air permeability: 60-80 CFM per square foot at ½ inch H₂O pressure.

EXAMPLE 3

A filter fabric prepared by the procedure of Example 2, supra., is sewn to a woven monofilament polypropylene scrim material. The purpose of the scrim is to reduce abrasion of the lower surface of the filter fabric. The ends of the sewn filter fabric are then joined with a metallic clip and in seam to obtain an endless belt having dimensions of 50 ft. × 6.0 ft. The edges of the belt are covered with an edge binding tape of woven polyaramid (Nomex;DuPont) treated with a self cross linking acrylic resin to enhance abrasion resistance. Brass grommets are positioned along the edges of the belt to allow attachment of the belt to a drive chain with hook springs. The filter belt is mounted in a conventional electrostatic painting spray booth. In use, the spray of excess dry paint powder from the electrostatic guns, having an average particle size of from 5 to 20 microns, which does not stick to the article being painted, falls and collects on the surface of the filter belt. As the belt passes a vacuum head, the collected powder is removed from the belt surface in a lint free condition and returned for respraying. The static pressure across the belt is less than 2 inches of water.

Those skilled in the art will appreciate that the filter fabrics of the invention may be post treated to provide them with any special characteristics desired. For example, the filter fabrics of the invention may be lubricated or treated with anti-static compounds for anti-static characteristics. They may also be treated with fire retardant compositions as for example by spraying or impregating the filter product with a fire-proofing agent such as a 1:1 mix of borax and boric acid applied in a 20% aqueous solution.

What is claimed is:

1. A process for making an air filter fabric which comprises;
   providing a non-woven web of thermoplastic, fusable, synthetic polymeric resin, staple fibers;
   coating the fibers with a film of a compatible fiber stabilizing agent;
   pressing the coated fibers together so as to rupture said film at fiber cross-over points; and
   fusing the fibers together at said cross-over points while the coating remains intact at unruptured points, whereby the fundamental shape, geometry or configuration of the staple fibers is not altered to any significant degree and there is no significant reduction in pore size or air permeability of the filter fabric.

2. A process according to claim 1 wherein said film is removed following the fusing of said fibers together.

3. A process for making an air filter fabric, which comprises;
   providing a non-woven, needled web of polypropylene and staple fibers;
   coating the fibers with a film of polydimethylsiloxane in solvent;
   drying said film by driving off said solvent;
   applying heat and pressure to the web of coated fibers whereas said fibers are fused at cross-over points while the coating remains intact at unruptured points, whereby the fundamental shape, geometry or configuration of the staple fibers is not altered to any significant degree and there is no significant reduction in the pore sizes or air permeability of the filter fabric; and
   removing said coating.

* * * * *